(12) United States Patent
Patenaude et al.

(10) Patent No.: US 7,561,950 B2
(45) Date of Patent: Jul. 14, 2009

(54) METHOD OF DETERMINING AND PREDICTING ENTERTAINMENT SELECTIONS FOR TELEMATICS UNITS

(75) Inventors: Russell A. Patenaude, Macomb Township, MI (US); Patty Valerio Kogowski, Macomb Township, MI (US); Brad T. Reeser, Lake Orion, MI (US); Julianne Petschke, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 476 days.

(21) Appl. No.: 11/021,446

(22) Filed: Dec. 22, 2004

(65) Prior Publication Data
US 2006/0136106 A1    Jun. 22, 2006

(51) Int. Cl.
*G06F 7/00* (2006.01)
(52) U.S. Cl. .......................... 701/36; 701/49; 307/10.1
(58) Field of Classification Search ................... 701/36; 307/9.1, 10.1; 455/3.01, 3.03, 3.06
See application file for complete search history.

(56) References Cited

U.S. PATENT DOCUMENTS

| | | | |
|---|---|---|---|
| 5,627,549 | A | 5/1997 | Park |
| 6,249,252 | B1 | 6/2001 | Dupray |
| 6,505,780 | B1 | 1/2003 | Yassin et al. |
| 6,546,257 | B1 | 4/2003 | Stewart |
| 6,819,268 | B2 | 11/2004 | Wakamatsu et al. |
| 6,961,536 | B2 * | 11/2005 | Himmel et al. ............ 455/3.01 |
| 7,043,699 | B2 * | 5/2006 | Obradovich ................ 715/790 |
| 2002/0067288 | A1 | 6/2002 | Wakamatsu et al. |
| 2003/0153329 | A1 | 8/2003 | Stefan et al. |
| 2004/0090121 | A1 * | 5/2004 | Simonds et al. ............ 307/10.1 |

* cited by examiner

*Primary Examiner*—Yonel Beaulieu

(57) ABSTRACT

A method for providing entertainment in a vehicle, including monitoring entertainment selections at a telematics unit, determining at least one user entertainment selection profile based on the monitoring and activating entertainment units based on the profile.

18 Claims, 7 Drawing Sheets

700

METHOD OF DETERMINING AND PREDICTING ENTERTAINMENT SELECTIONS FOR TELEMATICS UNITS

FIELD OF THE INVENTION

This invention relates generally to a strategy to determine and predict entertainment selections. In particular, the invention relates to providing entertainment in a vehicle by determining an entertainment selection profile.

BACKGROUND OF THE INVENTION

The opportunity to personalize features in a mobile vehicle is ever increasing as the automobile is being transformed into a communications and entertainment platform as well as a transportation platform. Many new cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

The current telematics services available in vehicles do not provide a method to determine and predict a user's entertainment selections, such as a radio station on an FM radio or a compact disc track of a CD in a CD player. Additionally, current telematics services are not available to turn on entertainment units during power-up of a vehicle, based on the predicted entertainment selections.

It is desirable, therefore, to provide a method, computer usable medium and system that overcomes the limitations described above by providing a method to monitor entertainment selections to determine a user entertainment selection profile.

SUMMARY OF THE INVENTION

One aspect of the present invention is a method for providing entertainment in a vehicle including monitoring entertainment selections at a telematics unit, determining at least one user entertainment selection profile based on the monitoring and activating entertainment units based on the profile.

A second aspect of the present invention is a system for providing entertainment in a vehicle including means for monitoring entertainment selections at a telematics unit, means for determining at least one user entertainment selection profile based on the monitoring and means for activating entertainment units based on the profile.

A third aspect of the present invention provides a computer readable medium storing a computer program having computer readable code for monitoring entertainment selections at a telematics unit, computer readable code for determining at least one user entertainment selection profile based on the monitoring and computer readable code for activating entertainment units based on the profile.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
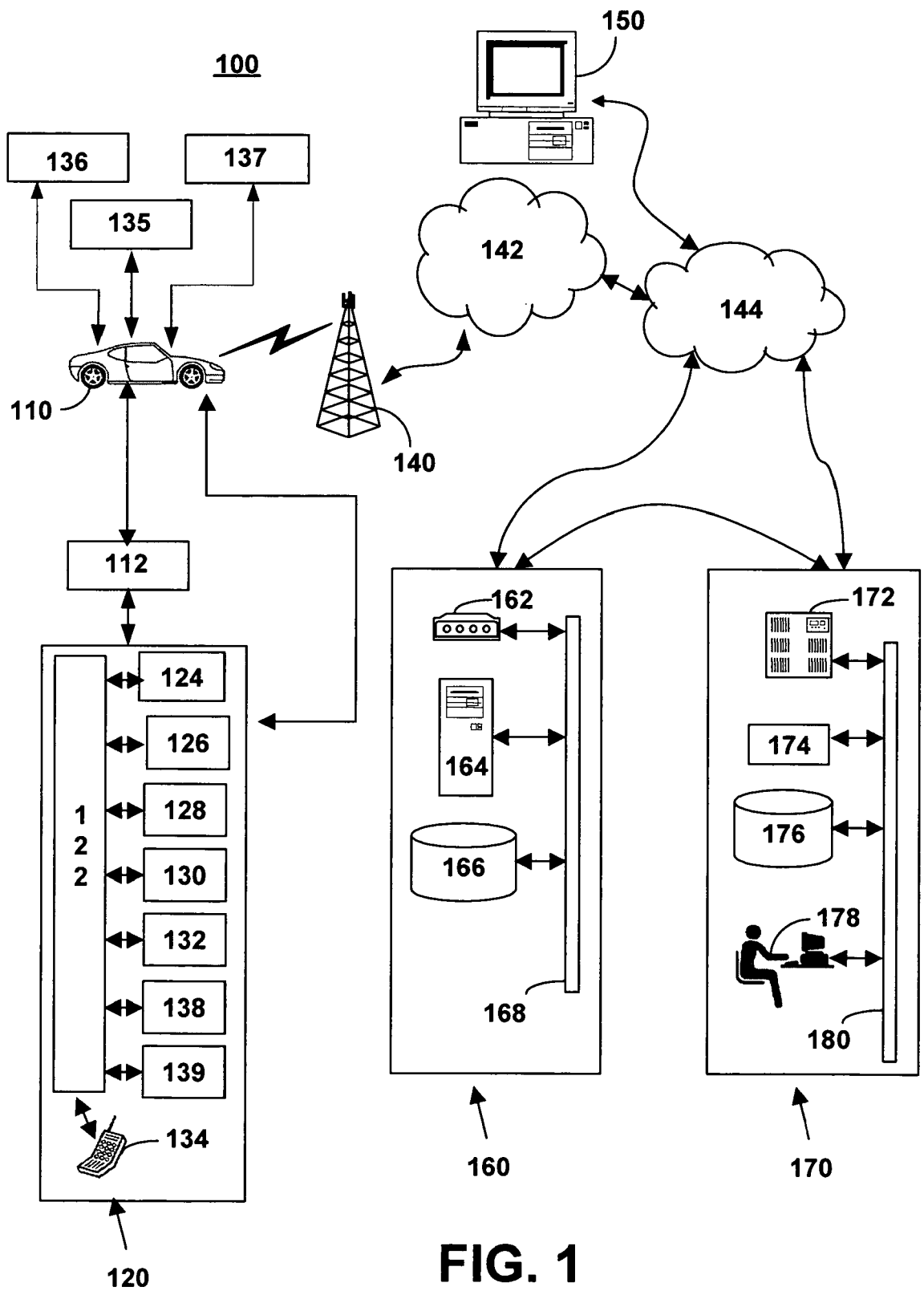
FIG. 1 is a schematic diagram of a system for providing access to a telematics system in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and/or one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, an embedded or in-vehicle mobile phone 134 and sensors 138. The sensors 138 include position and pressure sensors in the seats of the MVCU 110 and gyroscopes in the rear view mirrors. In other embodiments, telematics unit 120 may be implemented without one or more of the above listed components, such as, for example GPS unit 126 or speakers 132. The telematics 120 unit may contain a speech recognition unit 139 used to act on commands annunciated by a user. Telematics unit 120 may include additional components not relevant to the present discussion.

In one embodiment, processor 122 is a digital signal processor (DSP). Processor 122 is implemented as a microcontroller, microprocessor, controller, host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone, such as, for example an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various entertainment units 135, 136, and 137 in the MVCU 110. The entertainment units 135, 136, and 137 may include a compact disk (CD) player, an AM radio, an FM radio, a satellite radio, televisions and other electronic entertainment. In one embodiment, these digital signals activate the operation modes of the entertainment units 135, 136, and 137, as well as provide for data transfers between the telematics unit 120 and the entertainment units 135, 136, and 137.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and/or land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and/or land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and/or land network 144 using voice transmissions, or through communication services manager 174 and switch 172 using data transmissions. Switch 172 selects between voice transmissions and data transmissions.

Figure 2:
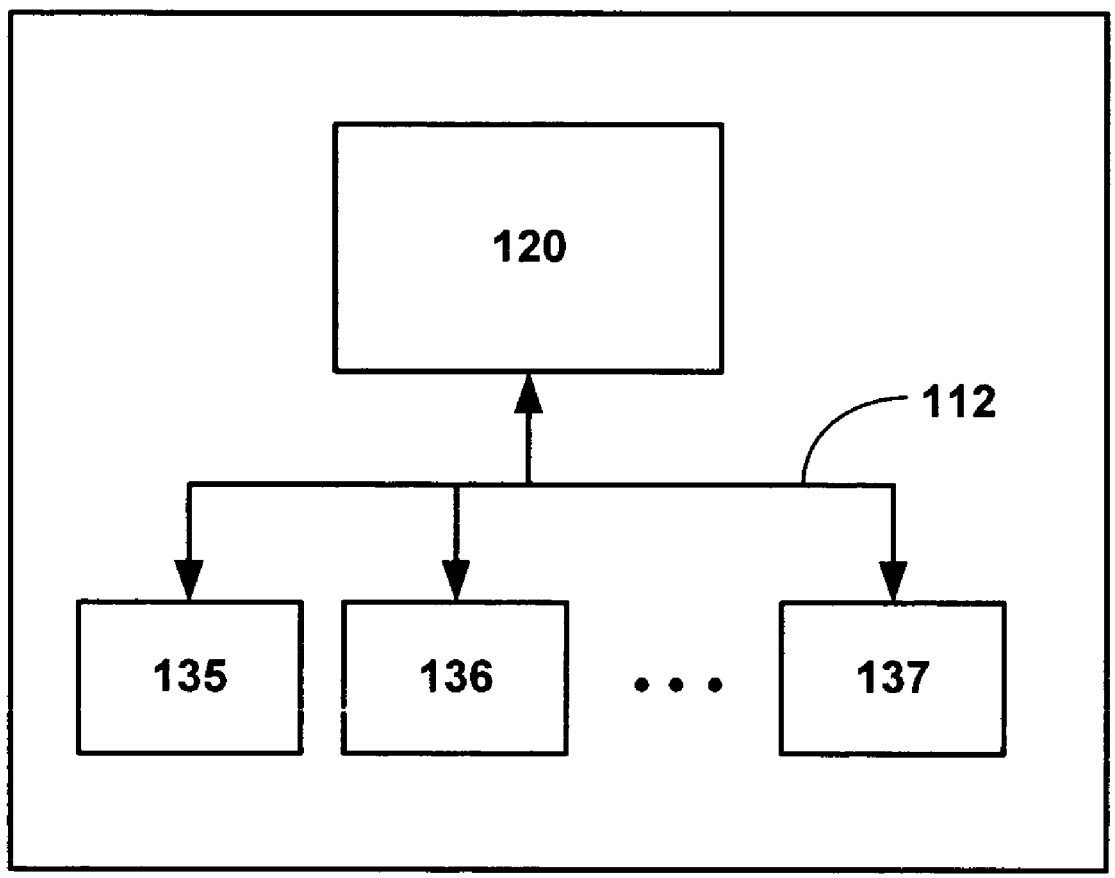
FIG. 2 is a schematic diagram of one embodiment of transmission paths for the monitored entertainment units.

FIG. 2 is a schematic diagram 200 of one embodiment of transmission paths for a plurality of monitored entertainment units 135, 136 and 137 in the MVCS 100 in accordance with the present invention. The monitoring transmission paths provide electrical communication between the telematics unit 120 and the entertainment units 135, 136 and 137. The monitoring transmission paths are a part of the vehicle communication network 112.

In one embodiment, the entertainment units 135, 136 and 137 and the telematics unit 120 incorporate a short-range wireless communication chip, such as a WiFi chip or a Bluetooth chip. In this embodiment, the entertainment units 135, 136 and 137 transmit the entertainment unit factor to the telematics unit 120 via a wireless connection (not shown).

The entertainment units 135, 136, and 137 can be compact disc (CD) players, digital video devices (DVD), tape players, game units, radios including satellite radio, AM radios, and FM radios and televisions including digital TVs and high density televisions (HDTV).

Figure 3:
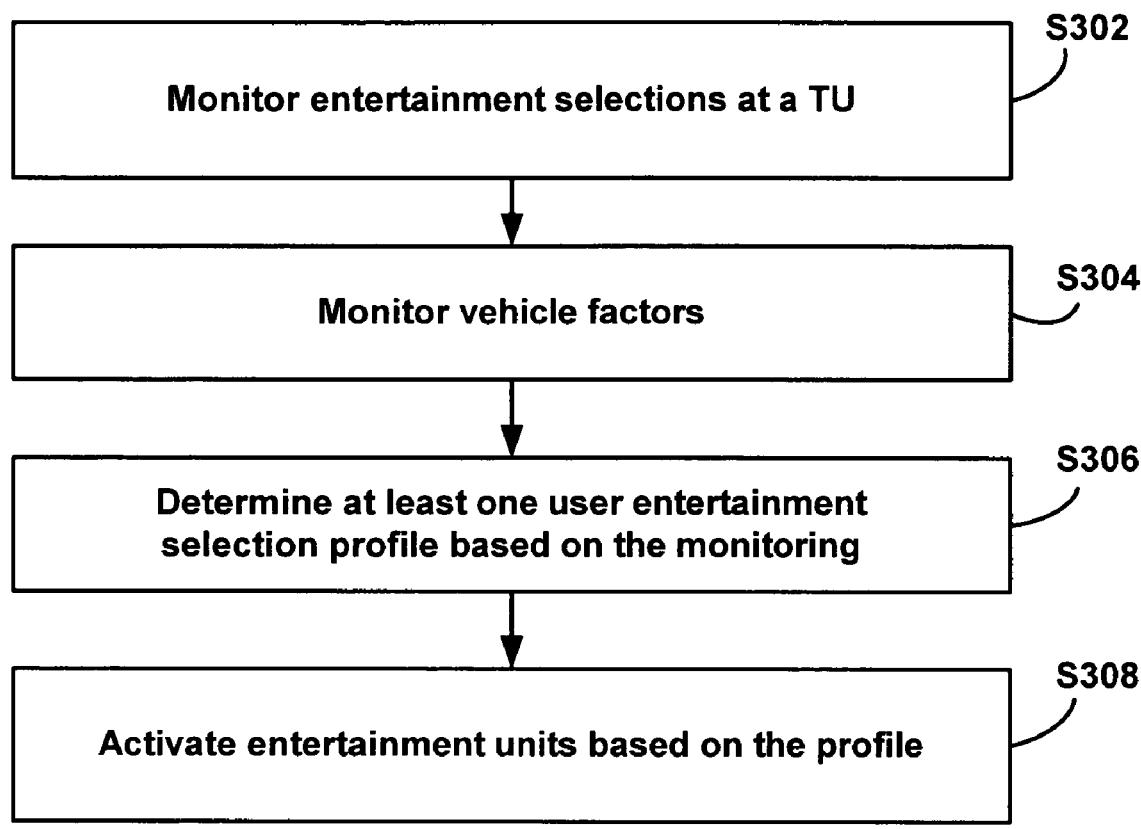
FIG. 3 illustrates a method representative of a first embodiment of a method of providing entertainment in a vehicle in accordance with the present invention.

FIG. 3 illustrates a method 300 representative of a first embodiment of a method of providing entertainment in an MVCU 110 in accordance with the present invention. The telematics unit 120, the processor 122, the entertainment units 135, 136, and 137, and sensors 138 within the MVCU 110, have stored in computer readable medium at least one computer program including computer readable code to perform the operations described with reference to method 300.

During stage S302, the telematics unit 120 monitors entertainment selections in the MVCU 110. When a user of the MVCU 110 turns on or turns-off a monitored entertainment unit 135, 136 and 137, data is transmitted via the transmission paths described with respect to FIG. 2 to the telematics unit 120.

In one embodiment, the monitored entertainment units 135, 136 and 137 are configured to transmit an entertainment unit factor upon power-up of the entertainment units 135, 136 and 137. In another embodiment, the telematics unit 120 is configured to request the entertainment unit factor upon power-up of the entertainment units 135, 136 and 137.

During stage S304, the telematics unit 120 monitors vehicle factors. Vehicle factors may include, for example, one or more of the following: the number of passengers, locations of passengers, location of the MVCU 110 at power-up, a location of the MVCU 110 when the entertainment selection occurs, the key used to power-up the vehicle, the rear view mirror position, and the driver seat position. The telematics unit 120 receives the data via the vehicle communication network 112. Vehicle factors are transmitted from sensors 138 in various locations in the MVCU 110.

Pressure sensors under each seat send a signal to the telematics unit 120 at power-up to indicate if a passenger is in a given seat. In an alternative embodiment, operation of a seat belt triggers transmission of a signal from a seat belt sensor to the telematics unit 120 to indicate if a passenger in a given seat is using a seat belt. In one embodiment, a change in pressure on a pressure sensor in a seat indicates if a passenger is in a given seat. A change in pressure can be used to determine if a child is placed in a semi-permanently installed car seat.

The GPS unit 126 transmits data to the telematics unit 120 at power-up and each time a new entertainment selection is made by the user. Key fobs can include an identifying chip, which includes identifying data. In some embodiments, two users, who regularly drive an MVCU 110, have their own separate identified key fob which they use every time they drive. The identifying data is transmitted to the telematics unit 120 during power-up to indicate if the key which powered-up the MVCU 110 is generally used by a first driver, a second driver or an $n^{th}$ driver.

The rear view mirror position data can be obtained from an internal gyroscope in the rear view mirror. Two different drivers may position the rear view mirror in different angles and that data is transmitted to the telematics unit 120 each time the position is altered. Additionally, the same driver may position the rear view mirror differently if there is a child in a back seat. The rear view mirror position is transmitted from the gyroscope in the rear view mirror to the telematics unit 120 at power-up and each time the position is changed.

Two different drivers may position the driver's seat differently. The driver seat position is transmitted from one or more sensors 138 in the driver's seat to the telematics unit 120 at power-up and each time the seat position is changed.

During stage S306, the telematics unit 120 determines at least one user entertainment selection profile based on the monitoring of entertainment selections and vehicle factors. There is more than one embodiment to determine a user entertainment selection profile. Method 400, method 600 and method 700 are three possible embodiments of the method of determining at least one user entertainment selection profile. Method 400, method 600 and method 700 are described below with reference to FIG. 4, FIG. 6 and FIG. 7, respectively.

During stage S308, the telematics unit 120 activates the entertainment units based on the determined user entertainment selection profile. Method 500 described below with reference to FIG. 5 describes the stages required for the telematics unit 120 to activate the entertainment units based on the determined user entertainment selection profile.

Figure 4:
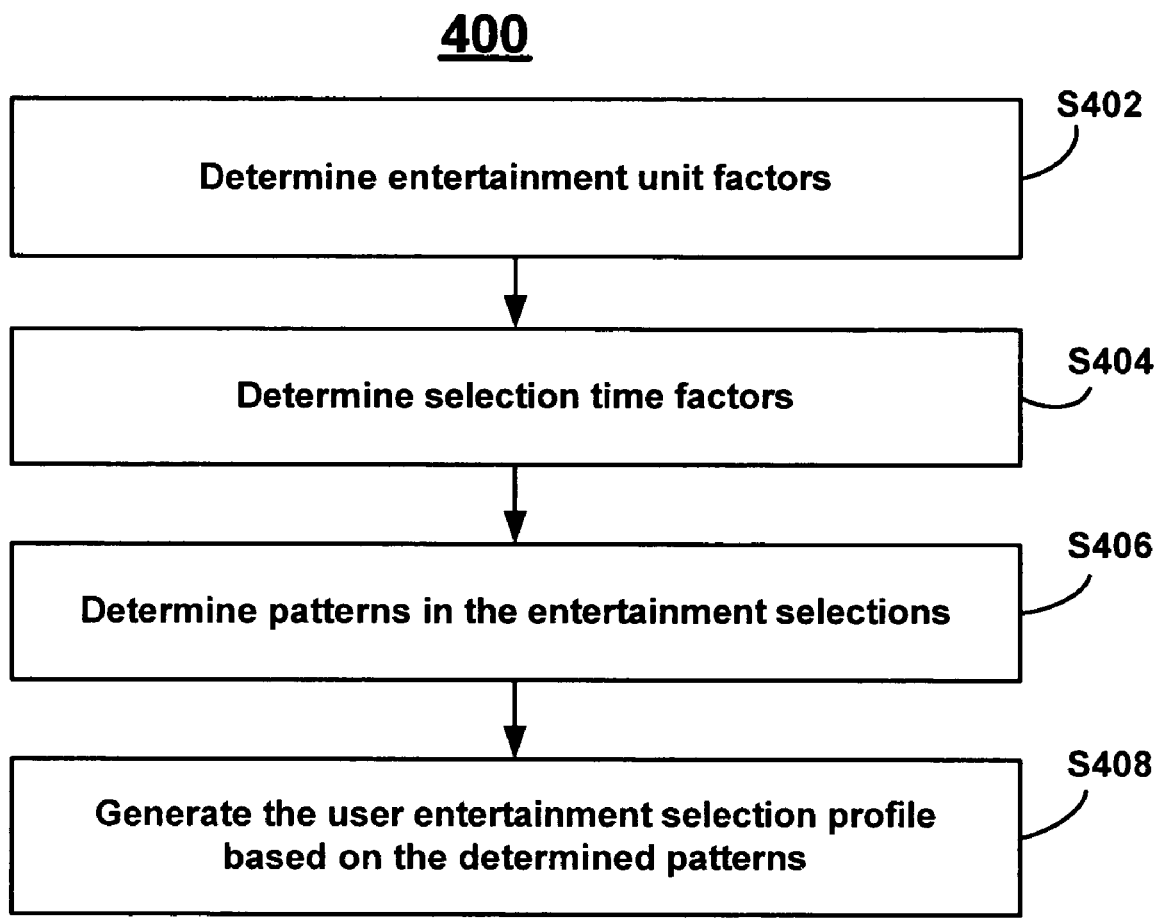
FIG. 4 illustrates a method representative of a first embodiment of a method of determining a user entertainment selection profile in accordance with the present invention.

FIG. 4 illustrates a method 400 representative of a first embodiment of a method of determining a user entertainment selection profile in accordance with the present invention. The telematics unit 120, the processor 122, the entertainment units 135, 136, and 137, and sensors 138 within the MVCU 110, have stored in computer readable medium at least one computer program including computer readable code to perform the operations described with reference to method 400.

During stage S402, the telematics unit 120 determines entertainment unit factors. The entertainment unit factors include one or more of the following: a satellite radio unit code, an AM radio unit code, an FM radio unit code, a received satellite signal frequency, a received AM signal frequency, a received FM signal frequency, a CD player unit code, a CD identifier code, a CD track number, a DVD unit code, a DVD identifier code, a DVD track number, a game unit code, a tape player unit code, a tape identifier code, a television unit code, and a received television signal frequency. A game unit code is comprised of an identifier that distinguishes a particular game unit.

The entertainment units 135, 136, and 137 include an embedded code that is transmitted via network 112 to the telematics unit 120 when the entertainment unit 135, 136, or 137 is powered-up as described above with respect to stage S302 in method 200 of FIG. 2. When the telematics unit 120 receives the entertainment unit factors, the processor 122 determines if additional related entertainment unit factors are needed. For example, if an FM unit code is received, the processor 122 determines that a received FM signal frequency is also required. The processor 122 determines if the received FM signal frequency was transmitted along with the FM unit code. If the FM unit code was not received, the processor 122 requests the received FM signal frequency. When the telematics unit 120 receives the received FM signal frequency, the processor 122 links the received FM signal frequency with the FM unit code. In one embodiment, the FM unit code and the received FM signal frequency are both sent from the FM radio upon power-up of the FM radio. The updating entertainment unit factors are saved in the in-vehicle memory 128.

During stage S404, the telematics unit 120 determines selection time factors. The selection time factors include the time of day of the entertainment selection, a day of week of the entertainment selection, a week of month of the entertainment selection, and a date of the entertainment selection. When the telematics unit 120 receives one or more entertainment unit factors, the processor 122 retrieves the date, time of day, day of week and week of the month from a clock and calendar internal to the telematics unit 120 and links them to the received entertainment unit factors. The selection time factors linked to the entertainment unit factors are saved in the in-vehicle memory 128. In one embodiment, software in the processor 122 establishes a table within the in-vehicle memory 128 and adds a new row to the table each time an entertainment unit factor is linked to the selection time factors.

During stage S406, the telematics unit 129 determines patterns in the entertainment selections. After a minimum number of entertainment unit factors and selection time factors are stored in the in-vehicle memory 128, the processor 122 applies an algorithm to the stored entertainment unit factors and selection time factors. The algorithm is operable to search for one or more patterns in the entertainment selections.

In one embodiment, the algorithm determines an FM radio is turned more than one time. The algorithm searches the acquired data to determine if the FM radio is tuned to the same received FM frequency signal within a twenty minute time frame each weekday. Next, the algorithm searches to determine if the FM radio is tuned to the same received FM frequency signal within a forty minute time frame each weekday. If more than one pattern is determined in a given time frame the algorithm narrows the time frame, to determine if more than one specific pattern falls within the twenty minute time frame.

In one example, if the algorithm determines that a first FM radio station and a second FM radio station are selected every weekday between 7:25 AM and 7:45 AM the algorithm narrows the time frame to distinguish that the first radio station is selected between 7:25 AM and 7:35 AM, a second FM radio station is selected between 7:35 and 7:40 and the first radio station is reselected between 7:40 and 7:45. This type of entertainment selection patterns a driver who listens to a local traffic report that is announced every weekday at about 7:40 on the second FM radio station and listens to the first FM radio station the remainder of the time spent driving to work. The telematics unit 120 can determine that a third FM radio station is selected every weekday between 5:15 PM and 5:50 PM.

During stage S408, the telematics unit 120 generates a user entertainment selection profile based on the determined patterns. The algorithm outputs one or more determined patterns to the processor 122. The processor 122 stores the user entertainment selection profile in the in-vehicle memory 128. In another embodiment, the user entertainment selection profile is stored at the call center 170. In one embodiment, the processor 122 programs a programmable chip to embed the determined patterns in the telematics unit 120. The embedded user entertainment selection profile is operable to activate one or more of the entertainment units 135, 136 and 137.

Figure 5:
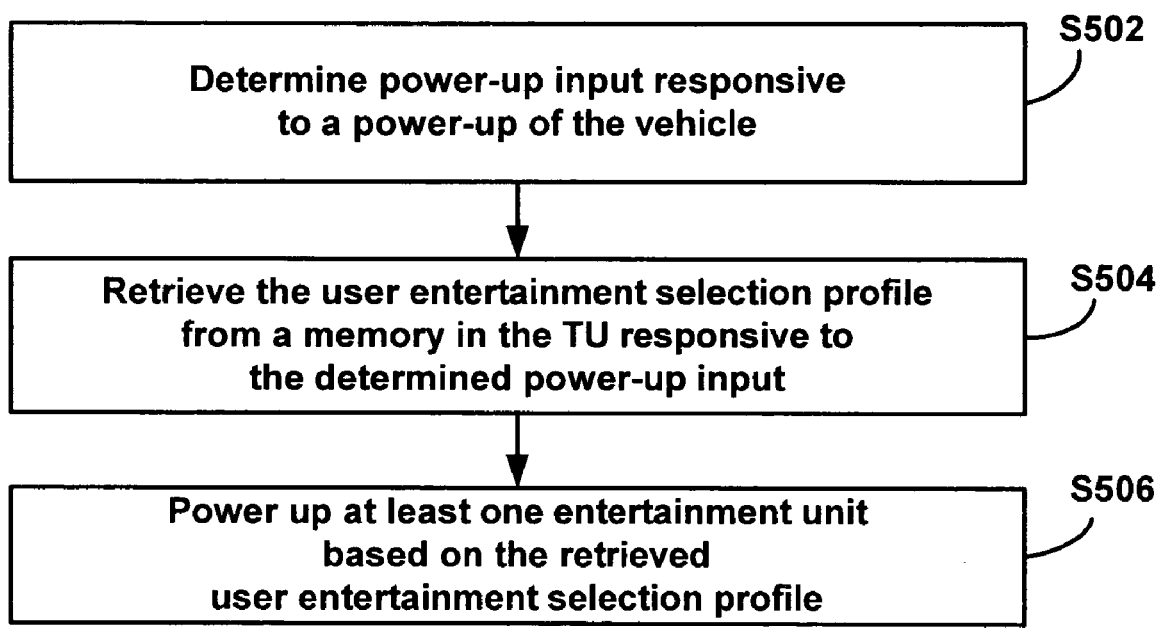
FIG. 5 illustrates a method representative of a first embodiment of a method of activating entertainment units in accordance with the present invention.

FIG. 5 illustrates a method 500 representative of a first embodiment of a method of activating entertainment units in accordance with the present invention. The telematics unit 120, the processor 122, the entertainment units 135, 136, and 137, and sensors 138 within the MVCU 110, have stored in computer readable medium at least one computer program including computer readable code to perform the operations described with reference to method 500.

During stage S502, the telematics unit 122 determines a power-up input responsive to the power-up of the MVCU 110. Each time the MVCU 110 is started, the processor 122 determines if a user entertainment selection profile is stored in the in-vehicle memory 128. If a user entertainment selection profile is stored in the in-vehicle memory 128, a power-up input is generated instructing the processor 120 to retrieve the user entertainment selection profile from the in-vehicle memory 128.

During stage S504, processor 122 retrieves the user entertainment selection profile stored in the in-vehicle memory 128 and the current time, day of week, week of the month and date from a clock and calendar internal to the telematics unit 120. The processor 122 then determines if the current time, day of week, week of the month and date is within the time frame of one the determined patterns of the user entertainment selection profile. If there is a match in the time frame, the processor 122 determines which entertainment selection is linked to the time frame in the user entertainment selection profile. Specifically, the processor 122 determines which entertainment units 135, 136, and 137 are typically turned on during this time frame.

During stage S506, the telematics unit 120 powers-up at least one entertainment unit 135, 136, or 137 based on the retrieved user entertainment selection profile. The processor 122 transmits a power-up signal to the one or more entertainment units 135, 136, and 137 operable to turn on the entertainment units 135, 136, and 137.

Figure 6:
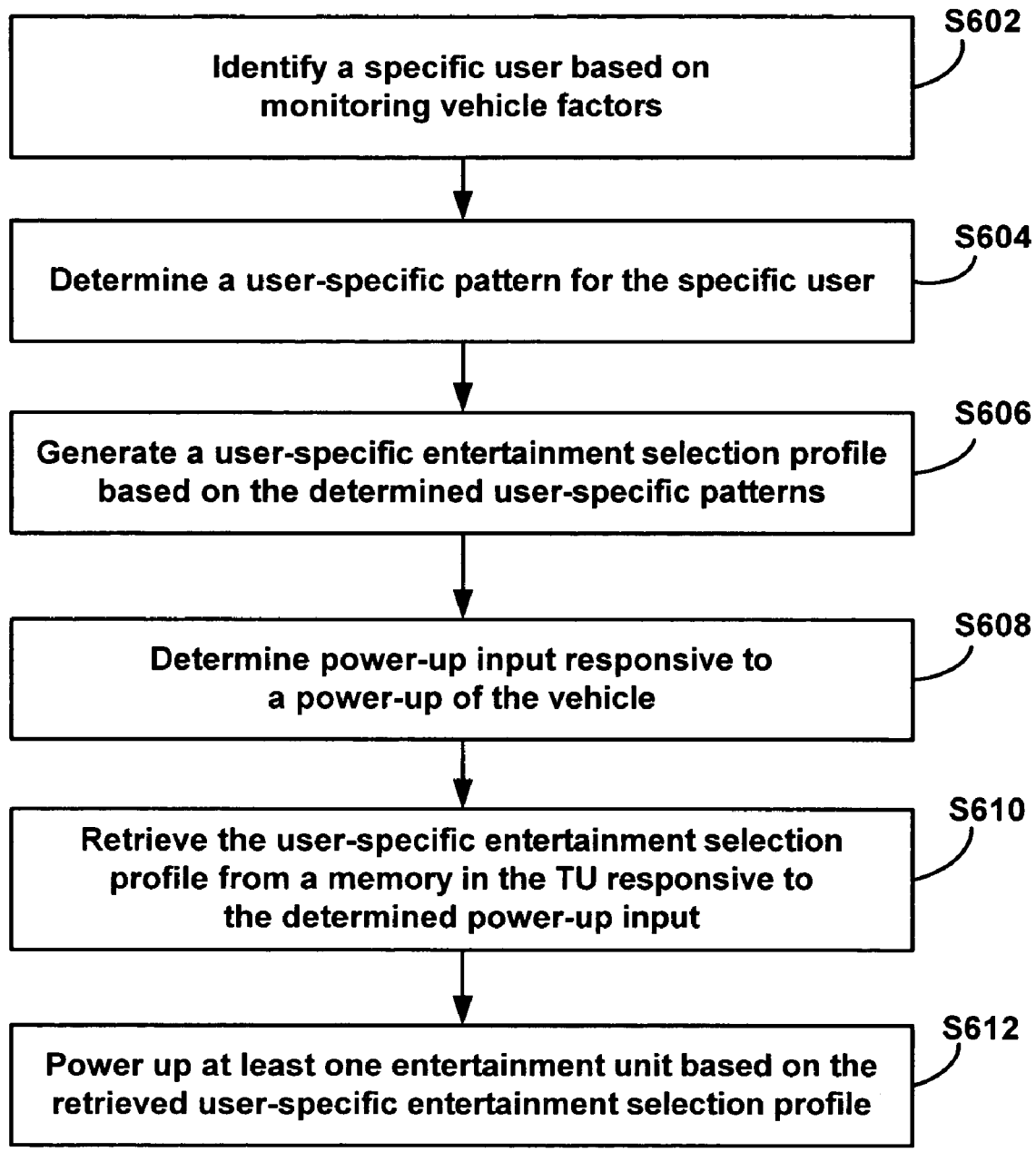
FIG. 6 illustrates a method representative of a second embodiment of a method of determining a user entertainment selection profile in accordance with the present invention.

FIG. 6 illustrates a method 600 representative of a second embodiment of a method of determining a user entertainment selection profile in accordance with the present invention. The telematics unit 120, the processor 122, the entertainment units 135, 136, and 137, and sensors 138 within the MVCU 110, have stored in computer readable medium at least one computer program including computer readable code to perform the operations described with reference to method 600.

During stage S602, the telematics unit 120 identifies a specific user based on monitoring vehicle factors in the MVCU 110 as described above with respect to stage S304 of method 300 in FIG. 3. If each key used to power-up the MVCU 110 is assigned to a specific driver, who consistently uses the assigned key when driving the MVCU 110, and if the assigned key fob includes an identifying chip, then the key can indicate which driver powers-up the vehicle. In one embodiment, the rear view mirror position is in one position for a first driver and a second position for a second driver. A gyroscope in the rear view mirror can transmit a data signal to the processor 120 via the vehicle communication network 112, when the position of the rear view mirror is adjusted. In another embodiment, a position sensor and/or a pressure sensor in the driver's seat can transmit a positional signal and pressure signal via the vehicle communication network 112 when the position and/or pressure sensors in the driver's seat detect a change in position and/or pressure.

In one embodiment, the telematics unit 120 identifies the specific user based on a combination of the key used to power-up the MVCU 110, the rear view mirror position, the driver's seat position, pressure on the driver's seat, and other vehicle factors such as number of passengers, locations of passengers, a location of the vehicle at power-up, and a location of the vehicle when the entertainment selection occurs. For example, the first driver may almost always drive with a passenger in a specific back seat location, such a baby in a car seat that is installed in one seat location.

When a specific user of the MCVCU 110 turns on or off a monitored entertainment unit 135, 136 and 137, data is transmitted via the transmission paths described with respect to FIG. 2 to the telematics unit 120.

During stage S604, the telematics unit 120 determines a user-specific pattern for the specific user identified during stage S602.

In one embodiment, the monitored entertainment units 135, 136 and 137 are configured to transmit an entertainment unit factor upon power-up of the entertainment units 135, 136 and 137. In another embodiment, the telematics unit 120 is configured to request the entertainment unit factor upon power-up of the entertainment units 135, 136 and 137.

After a minimum number of entertainment unit factors and selection time factors are stored in the in-vehicle memory 128 for the specific user, the processor 122 applies an algorithm on the stored entertainment unit factors and selection time factors, as described above with respect to stages S402 and S404 in method 400 of FIG. 4, for the specific user. The algorithm is operable to search for one or more patterns in the time frame in which an entertainment unit is selected by the specific user.

In one embodiment, the algorithm searches the acquired data to determine if the FM radio is tuned to the same received FM frequency signal within a specified time frame each weekday for the specific user. The algorithm searches to determine if the entertainment factors are correlated to a number and/or location of passengers. In one example, the algorithm can determine a pattern in which a first specific driver turns on a CD player to play a CD of children's songs when a passenger is in a location in the back seat within the time frame of 8:00 AM to 8:15 AM. The algorithm can also determine a pattern in which the first specific driver turns on a FM radio station after the MVCU 110 is powered-up within the time frame of 8:30 AM to 8:45 AM and there is no passenger in the MVCU 110. Such a pattern is possible if, for example, the first driver drops a child off at day-care center on the way to work.

During stage S606, the telematics unit 120 generates a user-specific entertainment selection profile based on the determined user-specific patterns. The algorithm outputs one or more determined patterns for the specific user to the processor 122. The processor 122 stores the user-specific entertainment selection profile in the in-vehicle memory 128. In one embodiment, the processor 122 programs a programmable chip to embed the determined patterns in the telematics unit 120 and stores the user-specific entertainment selection profile in the in-vehicle memory 128. The embedded user entertainment selection profile is operable to activate one or more of the entertainment units 135, 136 and 137.

During stage S608, the telematics unit 120 determines a power-up input responsive to the power-up of the MVCU 110. Each time the MVCU 110 is started, the processor 122 determines if a user-specific entertainment selection profile is stored in the in-vehicle memory 128. If a user-specific entertainment selection profile is stored in the in-vehicle memory, a power-up input is generated instructing the processor 120 to retrieve the user-specific entertainment selection profile from the in-vehicle memory 128.

During stage S610, processor 122 in the telematics unit 120 retrieves the user-specific entertainment selection profile stored in the in-vehicle memory 128 and the current time, day of week, week of the month and date from a clock and calendar internal to the telematics unit 120. The processor 122 then determines if the current time, day of week, week of month and date is within the time frame of one the determined patterns of the user-specific entertainment selection profile. If there is a match in the time frame, the processor 122 determines which entertainment selection is linked to the time frame in the user-specific entertainment selection profile. Specifically, the processor 122 determines which entertainment units 135, 136, and 137 are typically turned on during this time frame by the specific.

During stage S612, the telematics unit 120 powers-up at least one entertainment unit 135, 136, or 137 based on the retrieved user-specific entertainment selection profile. The processor 122 transmits a signal to the one or more entertainment units 135, 136, and 137 operable to power-up the entertainment units 135, 136, and 137.

Figure 7:
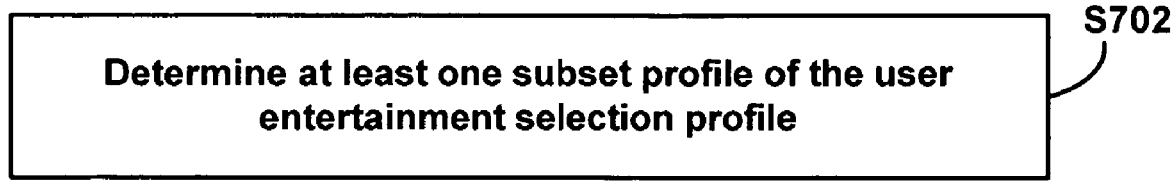
FIG. 7 illustrates a method representative of a third embodiment of a method of determining a user entertainment selection profile in accordance with the present invention.

FIG. 7 illustrates a method 700 representative of a third embodiment of a method of determining a user entertainment selection profile in accordance with the present invention. The telematics unit 120, the processor 122, the entertainment units 135, 136, and 137, and sensors 138 within the MVCU 110, have stored in computer readable medium at least one computer program including computer readable code to perform the operations described with reference to method 700.

During stage S702, the telematics unit 120 determines at least one subset profile of the user entertainment selection profile. The subset profile is determined based on monitoring a subset of the entertainment selections.

The subset profile can be used for a periodic trip that a specific user takes on a given day of the week or a given day of the week within a given week of the month. In an exemplary case, a user drives to a distant city every third Tuesday of the month, and chooses to operate the CD player when the MVCU 110 reaches a location that is fifty miles outside the originating city and the initially selected FM radio signal has become too weak to be received at the MVCU 110. In this case, the subset profile is set to power-up a CD player when the MVCU 100 is in a GPS location that is fifty miles outside the originating city on the third Tuesday of the month. In one embodiment of this case, the subset profile powers-up the FM radio when the MVCU 110 is powered-up within a ten minute range of 6:30 AM on the third Tuesday of the month and then turns off the FM radio and turns on the CD player when the MVCU 100 reaches a GPS location that is fifty miles outside the originating city.

Upon power-up of an entertainment unit 135, 136, or 137, the user pushes a button on the telematics unit 120 to indicate that this selection of an entertainment unit 135, 136, or 137 is to be part of a subset profile. The user can indicate more than one subset profile by an additional button push. The telematics unit 120 then requests data from the various sensors 138 in the MVCU 110. The processor 122 determines patterns within the entertainment selections, the vehicle factors and the selection time factors and generates the subset profile, which is saved in the in-vehicle memory 128. The processor 122 in the telematics unit 120 checks for changes in the patterns every time additional data is received for the specific subset profile.

In another embodiment, the user may annunciate selections of an entertainment unit 135, 136, or 137 via the speech recognition system 139 embodied within the telematics unit 120. The annunciated selections are included in a subset profile. The user can indicate more than one subset profile by additional annunciations.

In one embodiment, the user indicates the subset profile by telling a communication services advisors 178 the time frame of the subset profile and the telematics unit 120 then incorporates all entertainment unit selections within that time frame within the subset profile. In an alternate embodiment of this case, the user can indicate the subset profile by inputting a sequence of keystrokes on a keyboard on a personal or user computer 150. If the user inputs a sequence to a personal or user computer 150, the data is transmitted to the processor 122 via one or more wireless carrier systems 140, one or more communication networks 142, one or more land networks 144, one or more web-hosting portals 160, and/or one or more call centers 170.

When the MVCU 110 is powered-up within the time frame or location of the subset profile of the user entertainment selection profile, the telematics unit 120 activates entertainment units 135, 136, and 137 based on the determined subset profile in the same manner that the telematics unit 120 activates entertainment units based on the determined user entertainment selection profile as described above in reference to stage S308 of method 300 in FIG. 3.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method for providing entertainment in a vehicle, comprising:
    monitoring entertainment selections at a telematics unit, including user activation of one or more units selected from a plurality of entertainment units;
    determining at least one user entertainment selection profile based on the step of monitoring, wherein the determination of the entertainment selection profile is based on monitored vehicle factors in addition to the monitored entertainment selection, the monitored vehicle factors selected from the group consisting of a number of passengers, locations of passengers, a location of the vehicle at power-up, a location of the vehicle when the entertainment selection occurs, a key used to power-up the vehicle, a rear view mirror position, and a driver seat position; and
    selectively activating one or more of the plurality of entertainment units based on a user entertainment selection profile.

2. The method of claim 1, further comprising:
    identifying a specific user based on monitoring vehicle factors.

3. The method of claim 2, wherein determining at least one user entertainment selection profile based on monitoring entertainment selections comprises:
    determining a user-specific pattern for the specific user; and
    generating a user-specific entertainment selection profile based on the determined user-specific pattern.

4. The method of clam 3, wherein activating entertainment units based on the profile comprises:
    determining power-up input responsive to a power-up of the vehicle;

retrieving the user-specific entertainment selection profile from a memory in the telematics unit responsive to the determined power-up input; and powering up at least one entertainment unit based on the retrieved user-specific entertainment selection profile.

5. The method of claim 1, wherein determining at least one user entertainment selection profile based on the step of monitoring comprises:

determining at least one entertainment unit factor; and
determining at least one selection time factor.

6. The method of claim 5, wherein the at least one selection time factor is selected from a group consisting of a time of day for the entertainment selection, a day of week for the entertainment selection, a week of the month for the entertainment selection, and a date of the entertainment selection.

7. The method of claim 5, wherein the at least one entertainment unit is selected from a group consisting of a satellite radio unit code, an AM radio unit code, an FM radio unit code, a received satellite signal frequency, a received AM signal frequency, a received FM signal frequency, a CD player unit code, a CD identifier code, a CD track number, a DVD unit code, a DVD identifier code, a DVD track number, a game unit code, a tape player unit code, a tape identifier code, a television unit code, and a received television signal frequency.

8. The method of claim 1, wherein determining at least one user entertainment selection profile based on the monitoring comprises;

determining patterns in the entertainment selections; and
generating the user entertainment selection profile based on the determined patterns.

9. The method of clam 1, wherein activating entertainment units based on the user entertainment selection profile comprises:

determining power-up input responsive to a power-up of the vehicle;
retrieving the user entertainment selection profile from a memory in the telematics unit responsive to the determined power-up input; and
powering up at least one entertainment unit based on the retrieved user entertainment selection profile.

10. The method of claim 1, wherein determining at least one user entertainment selection profile based on the step of monitoring comprises determining at least one subset profile of the user entertainment selection profile wherein the subset profile is determined based on monitoring a subset of the entertainment selections.

11. A computer readable medium having thereon computer-executable instructions comprising instructions for:

monitoring entertainment selections at a telematics unit, including user activation of one or more units selected from a plurality of entertainment units;
determining at least one user entertainment selection profile based on the monitoring, wherein the determination of the entertainment selection profile is based on monitored vehicle factors in addition to the monitored entertainment selection, the monitored vehicle factors selected from the group consisting of a number of passengers, locations of passengers, a location of the vehicle at power-up, a location of the vehicle when the entertainment selection occurs, a key used to power-up the vehicle, a rear view mirror position, and a driver seat position; and
selectively activating one or more of the plurality of entertainment units based on a user entertainment selection profile.

12. The computer readable medium of claim 11, wherein determining at least one user entertainment selection profile based on the monitoring comprises:

determining at least one entertainment unit factor; and
determining at least one selection time factor.

13. The computer readable medium of claim 11, wherein determining at least one user entertainment selection profile based on the monitoring comprises;

determining patterns in the entertainment selections; and
generating the user entertainment selection profile based on the determined patterns.

14. The computer readable medium of clam 11, wherein selectively activating one or more of the plurality of entertainment units based on a user entertainment profile comprises:

determining power-up input responsive to the power-up of the vehicle;
retrieving the user entertainment selection profile from a memory in the telematics unit responsive to the determined power-up input; and
powering up at least one entertainment unit based on the retrieved user entertainment selection profile.

15. The computer readable medium of claim 11, further comprising computer-executable instructions for:

identifying a specific user based on monitoring entertainment selections.

16. The computer readable medium of claim 15, wherein determining at least one user entertainment selection profile based on the monitoring comprises:

determining a user-specific pattern for the specific user; and
generating a user-specific entertainment selection profile based on the determined user-specific pattern.

17. The computer readable medium of clam 16, wherein selectively activating one or more of the plurality of entertainment units based on a user entertainment profile comprises:

determining power-up input responsive to the power-up of the vehicle;
retrieving the user-specific entertainment selection profile from a memory in the telematics unit responsive to the determined power-up input; and
powering up at least one entertainment unit based on the retrieved user-specific entertainment selection profile.

18. The computer readable medium of claim 11, wherein determining at least one user entertainment selection profile based on the monitoring comprises determining at least one subset profile of the user entertainment selection profile wherein the subset profile is determined based on monitoring a subset of the entertainment selections.

* * * * *